(12) United States Patent
Wang et al.

(10) Patent No.: US 10,324,238 B2
(45) Date of Patent: Jun. 18, 2019

(54) ANTI-PEEP FILM, METHOD FOR MANUFACTURING THE SAME AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Chen Wang, Beijing (CN); Kui Lv, Beijing (CN); Xiao Guo, Beijing (CN); Kang Xiang, Beijing (CN); Xinxia Zhang, Beijing (CN); Fengzhen Lv, Beijing (CN); Qun Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 107 days.

(21) Appl. No.: 15/228,520

(22) Filed: Aug. 4, 2016

(65) Prior Publication Data

US 2017/0192139 A1     Jul. 6, 2017

(30) Foreign Application Priority Data

Jan. 4, 2016   (CN) .......................... 2016 1 0006845

(51) Int. Cl.
*G02B 5/02*     (2006.01)
*G02B 1/14*     (2015.01)
(Continued)

(52) U.S. Cl.
CPC ...... *G02B 5/0294* (2013.01); *B29D 11/00634* (2013.01); *B29D 11/00788* (2013.01);
(Continued)

(58) Field of Classification Search
CPC ...... G02B 5/0294; G02B 1/14; G02B 3/0037; G02B 5/0226; G02B 19/0009; G02B 27/022; B29D 11/00634
(Continued)

(56) References Cited

U.S. PATENT DOCUMENTS

2015/0042934 A1   2/2015  Kanno et al.
2015/0109674 A1*  4/2015  Cok ...................... G02B 5/003
                                                     359/613
(Continued)

FOREIGN PATENT DOCUMENTS

CN      202357548 U     8/2012
CN      203623082 U     6/2014
CN      203644041 U     6/2014

OTHER PUBLICATIONS

Y. Feng, et. al., "Peep-Proof Film", CN202357548, machine translation.*
(Continued)

*Primary Examiner* — Wen Huang
(74) *Attorney, Agent, or Firm* — Nath, Goldberg & Meyer; Joshua B. Goldberg

(57) ABSTRACT

The present invention discloses an anti-peep film, a method for manufacturing the same and a display device. The anti-peep film includes a main body and at least one light converging structure provided inside the main body; a refractive index of the main body is different from a refractive index of the light converging structure, to cause incident light to be outputted after being converged by the light converging structure. In the anti-peep film, the method for manufacturing the same and the display device provided by the present invention, a light converging structure is located inside a main body, and a refractive index of the main body is different from a refractive index of the light converging structure, to cause incident light to be outputted after being (Continued)

converged by the light converging structure, such that the display device has good anti-peep properties in all the different viewing directions.

17 Claims, 1 Drawing Sheet

(51) Int. Cl.
  *B29D 11/00* (2006.01)
  *G02B 3/00* (2006.01)
  *G02B 19/00* (2006.01)
  *G02B 27/02* (2006.01)

(52) U.S. Cl.
  CPC ............ *G02B 1/14* (2015.01); *G02B 3/0037* (2013.01); *G02B 5/0226* (2013.01); *G02B 19/0009* (2013.01); *G02B 27/022* (2013.01)

(58) Field of Classification Search
  USPC .............................................. 359/613; 3/613
  See application file for complete search history.

(56) References Cited

U.S. PATENT DOCUMENTS

2015/0138783 A1   5/2015   Umeda et al.
2015/0378069 A1   12/2015   Yamamoto et al.

OTHER PUBLICATIONS

Sears2015, "Hoffmaster (Price/case/1000ct)Hoffmaster 760140 Bowl, Flared rim for easy handling", added Aug. 17, 2015, "https://www.sears.com/hoffmaster-price-case-1000ct-hoffmaster-760140-bowl-flared-rim-for/p-SPM11801111215?plpSellerId=Bidlessnow&prdNo=2&blockNo=2&blockType=G2", website captured on Jun. 29, 2018.*
First Office Action dated Dec. 16, 2016 in corresponding Chinese Application No. 201610006845.0.

* cited by examiner

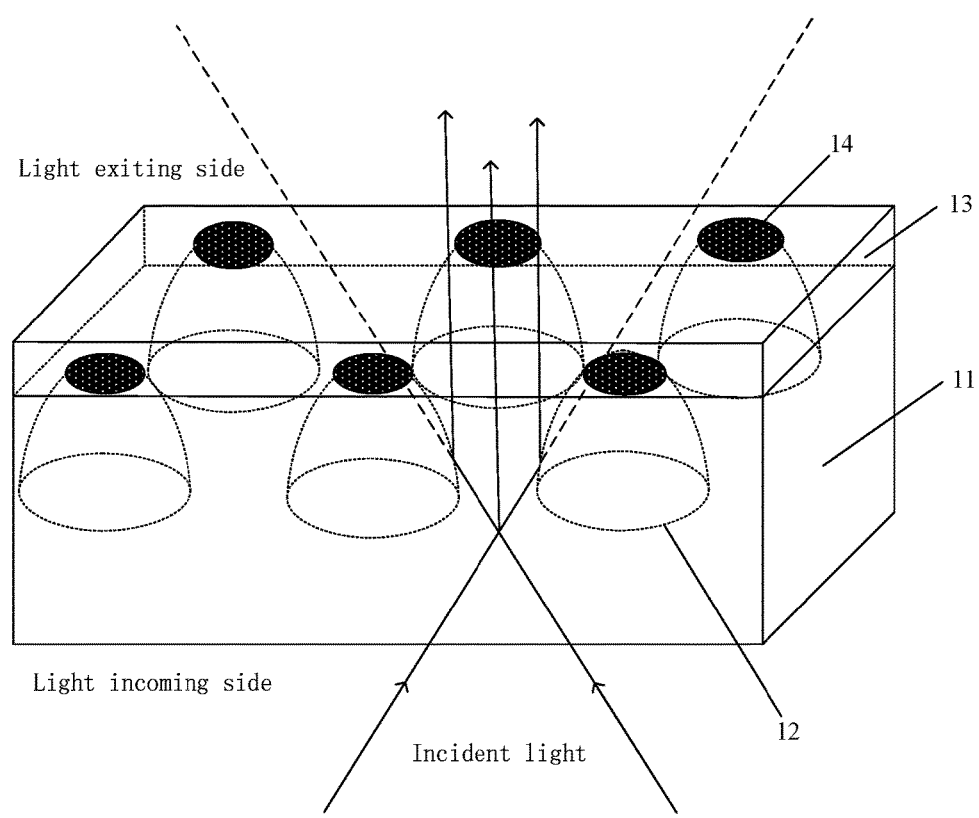

ANTI-PEEP FILM, METHOD FOR MANUFACTURING THE SAME AND DISPLAY DEVICE

TECHNICAL FIELD

The present invention relates to the field of display technology, and in particular relates to an anti-peep film, a method for manufacturing the same and a display device.

BACKGROUND

As the continuously widening applications of display devices such as notebooks, tablet computers, smart phones and the like, a part of user population desire to use anti-peep films on display devices for protection of privacy.

At present, a generally used anti-peep film has a good anti-peep property in a left-right viewing direction, but has a poor anti-peep property in an up-down viewing direction, thereby resulting in a display device that cannot have good anti-peep properties in all the different viewing directions.

SUMMARY

The present invention provides an anti-peep film, a method for manufacturing the same and a display device, for realizing a display device having good anti-peep properties in all the different viewing directions.

As an aspect of the present invention, there is provided an anti-peep film, comprising a main body and at least one light converging structure provided inside the main body; wherein a refractive index of the main body is different from a refractive index of the light converging structure, to cause incident light to be outputted after being converged by the light converging structure.

Optionally, the refractive index of the main body is greater than the refractive index of the light converging structure.

Optionally, a width of an end of the light converging structure close to a light incoming side of the main body is greater than a width of another end of the light converging structure close to a light exiting side of the main body.

Optionally, the light converging structure has a shape of a bowl.

Optionally, the light converging structure is an air hole.

Optionally, the refractive index of the main body is smaller than the refractive index of the light converging structure.

Optionally, a width of an end of the light converging structure close to a light incoming side of the main body is smaller than a width of another end of the light converging structure close to a light exiting side of the main body.

Optionally, a material of the main body is a transparent photosensitive resin.

Optionally, the anti-peep film further comprises a protection layer provided at a light exiting side of the main body.

Optionally, scattering particles are provided at positions on the protection layer at least corresponding to the light converging structure.

Optionally, the at least one light converging structure comprises a plurality of light converging structures, and a pitch therebetween is 1 to 3 sub-pixels.

Optionally, the plurality of light converging structures are uniformly distributed in the main body.

As another aspect of the present invention, there is provided a display device, comprising a display panel and the above anti-peep film provided on the display device.

As another aspect of the present invention, there is provided method for manufacturing an anti-peep film, comprising: forming at least one light converging structure inside a main body, wherein a refractive index of the main body is different from a refractive index of the light converging structure, to cause incident light to be outputted after being converged by the light converging structure.

In the anti-peep film, the method for manufacturing the same and the display device provided by the present invention, a light converging structure is located inside a main body, and a refractive index of the main body is different from a refractive index of the light converging structure, to cause incident light to be outputted after being converged by the light converging structure, such that the display device has good anti-peep properties in all the different viewing directions.

BRIEF DESCRIPTION OF THE DRAWINGS

FIG. 1 is a schematic diagram of a structure of an anti-peep film provided by Embodiment 1 of the present invention.

DETAILED DESCRIPTION

In order to provide a better understanding of technical solutions of the present invention to those skilled in the art, an anti-peep film, a method for manufacturing the same and a display device provided by the present invention are described in detail below in conjunction with the accompanying drawings.

Embodiment 1

FIG. 1 is a schematic diagram of a structure of an anti-peep film provided by Embodiment 1 of the present invention. As shown in FIG. 1, the anti-peep film includes a main body 11 and at least one light converging structure 12 provided inside the main body 11. A refractive index of the main body 11 is different from a refractive index of the light converging structure 12, to cause an incident light to be outputted after being converged by the light converging structure 12.

In the present embodiment, the refractive index of the main body 11 may be greater than the refractive index of the light converging structure 12. Specifically, a width of an end of the light converging structure 12 close to a light incoming side of the main body 11 is greater than a width of another end of the light converging structure 12 close to a light exiting side of the main body 11. Preferably, as shown in FIG. 1, the light converging structure 12 has a shape of a bowl, with an opening (i.e. an end with a larger width) of the bowl facing towards the light incoming side. A shape, a size and the like of the light converging structure 12 may be set as necessary.

In the present embodiment, the light converging structure 12 may be an air hole, and a material of the main body 11 may be a transparent photosensitive resin. That is, the light converging structure 12 may be a hollow structure provided inside the main body 11, with its internal space filled with air. A refractive index of a transparent photosensitive resin is 1.5 to 1.9, and a refractive index of air is 1, thus the refractive index of the main body 11 is greater than the refractive index of the light converging structure 12. In the present embodiment, the light converging structure 12 may also be formed by filling the hollow structure with other material(s) (instead of air), and the main body 11 may also be formed of other transparent material(s), as long as it is ensured that the refractive index of the light converging structure 12 is smaller than the refractive index of the main body 11.

In the present invention, a plurality of light converging structures 12 may be provided, and a pitch between the light converging structures 12 may be set as necessary. Preferably, the pitch between the light converging structures 12 may be 1 to 3 sub-pixels, so as to better perform their converging function on incident light. Preferably, the light converging structures 12 may be uniformly distributed in the main body 11.

Further, the anti-peep film may also include a protection layer 13 provided at the light exiting side of the main body 11. The protection layer 13 may be a transparent structure, which is able to perform a function of protecting the main body 11 and the light converging structure 12. Preferably, a material of the protection layer 13 may include triacetyl cellulose (TAC) or acryl.

There may be provided scattering particles 14 at positions on the protection layer 13 at least corresponding to the light converging structure 12. The scattering particles 14 may be micron scale transparent particles, for example, $SiO_2$ particles. The scattering particles 14 may scatter light irradiated thereon, allowing the anti-peep film to have an anti-glare function, thereby significantly increasing a contrast of the anti-peep film in case of being looked squarely at. In the present embodiment, the scattering particles 14 may also cover the entire protection layer 13.

Further, the anti-peep film may also include a second protection layer (not shown) provided at the light incoming side of the main body 11, which may be used for protecting the main body 11.

As shown in FIG. 1, when the incident light is incident from the light incoming side of the main body 11 at a certain incident angle, the light converging structure 12 inside the main body 11 performs a total reflection on the incident light incident onto an interface between the main body 11 and the light converging structure 12, to converge the incident light, then the converged light will be outputted from the main body 11 at an emergence angle smaller than the incident angle. Dashed lines in FIG. 1 are emerging paths of light in a case where the light converging structure 12 is not provided in the main body 11, and in this case, the light is outputted at a relatively large emergence angle, without being converged, resulting in a poor anti-peep property of the display device. While in the present embodiment, the light converging structure 12 converges the incident light, causing the light (represented by solid lines) to be outputted at a relatively small emergence angle, thereby improving the anti-peep property of the display device. When a user uses a display device provided with the anti-peep film, since light is outputted at a relatively small emergence angle, the display device only can be squarely viewed by the user, realizing a good anti-peep property.

In the anti-peep film provided by the present embodiment, a light converging structure 12 is located inside a main body 11, and a refractive index of the main body 11 is different from a refractive index of the light converging structure 12, to cause incident light to be outputted after being converged by the light converging structure 12, such that the display device has good anti-peep properties in all the different viewing directions.

Embodiment 2

Embodiment 2 of the present invention provides an anti-peep film. The difference between the present embodiment and the above Embodiment 1 is that a refractive index of the main body is smaller than a refractive index of the light converging structure. In this case, a width of an end of the light converging structure close to a light incoming side of the main body is smaller than a width of another end of the light converging structure close to a light exiting side of the main body.

As for other features of the anti-peep film of the present embodiment, the above description of Embodiment 1 may be referred to, which is not repeated herein.

Embodiment 3

Embodiment 3 of the present invention provides a display device, which includes a display panel and an anti-peep film of Embodiment 1 or 2 provided on the display panel.

Specifically, the anti-peep film may be provided at a light exiting side of the display device. As for a detailed description of the anti-peep film, the above Embodiment 1 or 2 may be referred to, which is not repeated herein.

In the present embodiment, the display panel may include an in-plane switching (IPS) display panel, a fringe field switching (FFS) display panel, a vertical alignment (VA) display panel, or an active-matrix organic light emitting diode (AMOLED) display panel. The above types of display panels are all wide-viewing-angle display devices. When the anti-peep film of the present invention is applied to the above wide-viewing-angle display panels, the anti-peep film is able to perform convergence in a range of 360 degrees on light incident along all possible directions from a light incoming side, thereby causing viewing angles in all directions (including a left-right direction, an up-down direction, and an oblique direction) to become narrow, which in turn realizes good anti-peep effects in all viewing directions (including a left-right direction, an up-down direction, and an oblique direction).

Embodiment 4

Embodiment 4 of the present invention provides a method for manufacturing an anti-peep film, which includes: forming at least one light converging structure inside a main body, wherein a refractive index of the main body is different from a refractive index of the light converging structure, to cause an incident light to be outputted after being converged by the light converging structure.

Specifically, the light converging structure may be formed by performing exposure and development on the main body.

Further, the method may also include: forming a protection layer at a light exiting side of the main body.

Further, scattering particles may be provided at positions on the protection layer at least corresponding to the light converging structure. Specifically, the scattering particles may be formed on the protection layer by a common anti-glare process.

Further, forming the light converging structure inside the main body may include forming a hollow structure inside the main body, and filling the hollow structure with air.

The method for manufacturing an anti-peep film provided by the present embodiment may be used for manufacturing the anti-peep film provided by the above Embodiment 1 or 2, which may be referred to for a detailed description of the anti-peep film.

It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

The invention claimed is:

1. An anti-peep film, comprising a main body and at least one light converging structure provided inside the main body; wherein
a refractive index of the main body is different from a refractive index of the light converging structure, to cause incident light to be output after being converged by the light converging structure, the light converging structure has a shape of a bowl, wherein edges of a cross-section perpendicular to a surface of the anti-peep film of the light converging structure have a curved shape and a projection of each of the light converging structure onto a light exiting surface has a substantially circular shape.

2. The anti-peep film according to claim 1, wherein, the refractive index of the main body is greater than the refractive index of the light converging structure.

3. The anti-peep film according to claim 2, wherein a width of an end of the light converging structure close to a light incoming side of the main body is greater than a width of another end of the light converging structure close to a light exiting side of the main body.

4. The anti-peep film according to claim 3, wherein the light converging structure is an air hole.

5. The anti-peep film according to claim 1, wherein the refractive index of the main body is smaller than the refractive index of the light converging structure.

6. The anti-peep film according to claim 5, wherein a width of an end of the light converging structure close to a light incoming side of the main body is smaller than a width of another end of the light converging structure close to a light exiting side of the main body.

7. The anti-peep film according to claim 1, wherein a material of the main body is a transparent photosensitive resin.

8. The anti-peep film according to claim 1, further comprising a protection layer provided at a light exiting side of the main body.

9. The anti-peep film according to claim 8, wherein scattering particles are provided at positions on the protection layer at least corresponding to the light converging structure.

10. The anti-peep film according to claim 1, wherein the at least one light converging structure comprises a plurality of light converging structures, and a pitch therebetween is 1 to 3 sub-pixels.

11. The anti-peep film according to claim 10, wherein the plurality of light converging structures is uniformly distributed in the main body.

12. A display device, comprising a display panel and the anti-peep film according to claim 1 provided on the display panel.

13. The display device according to claim 12, wherein the anti-peep film further comprises a protection layer provided at a light exiting side of the main body; and scattering particles are provided at positions on the protection layer at least corresponding to the light converging structure.

14. A method for manufacturing an anti-peep film, comprising
forming at least one light converging structure inside a main body, wherein a refractive index of the main body is different from a refractive index of the light converging structure, to cause incident light to be output after being converged by the light converging structure, the light converging structure has a shape of a bowl, wherein edges of a cross-section perpendicular to a surface of the anti-peep film of the light converging structure have a curved shape and a projection of each of the light converging structure onto a light exiting surface has a substantially circular shape.

15. The method for manufacturing an anti-peep film according to claim 14, wherein forming the light converging structure inside the main body further comprises: forming a hollow structure inside the main body, and filling the hollow structure with air.

16. The method for manufacturing an anti-peep film according to claim 14, further comprising: forming a protection layer at a light exiting side of the main body.

17. The method for manufacturing an anti-peep film according to claim 16, further comprising: providing scattering particles at positions on the protection layer at least corresponding to the light converging structure.

* * * * *